US012166307B2

(12) United States Patent
Phatiwuttipat et al.

(10) Patent No.: US 12,166,307 B2
(45) Date of Patent: Dec. 10, 2024

(54) CONNECTOR INCLUDING A PAIR OF HOUSING MEMBERS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Pipatthana Phatiwuttipat, Mie (JP); Kenji Makino, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/768,323

(22) PCT Filed: Aug. 21, 2020

(86) PCT No.: PCT/JP2020/031613
§ 371 (c)(1),
(2) Date: Apr. 12, 2022

(87) PCT Pub. No.: WO2021/084864
PCT Pub. Date: May 6, 2021

(65) Prior Publication Data

US 2024/0106149 A1 Mar. 28, 2024

(30) Foreign Application Priority Data

Oct. 29, 2019 (JP) ................................ 2019-195762

(51) Int. Cl.
*H01R 13/424* (2006.01)
*H01R 13/436* (2006.01)
*H01R 13/506* (2006.01)

(52) U.S. Cl.
CPC ......... *H01R 13/436* (2013.01); *H01R 13/424* (2013.01); *H01R 13/506* (2013.01)

(58) Field of Classification Search
CPC ... H01R 13/436; H01R 13/424; H01R 13/506
See application file for complete search history.

(56) References Cited

U.S. PATENT DOCUMENTS 5,100,345 A 3/1992 Endo et al.
5,419,722 A 5/1995 Onoda
(Continued)

FOREIGN PATENT DOCUMENTS

WO 2019/188739 A1 10/2019

OTHER PUBLICATIONS

International Search Report issued on Oct. 20, 2020 for WO 2021/084864 A1 (5 pages).

*Primary Examiner* — Vanessa Girardi
(74) *Attorney, Agent, or Firm* — Venjuris, P.C.

(57) ABSTRACT

A connector includes a terminal fitting and an upper housing and a lower housing slidable in a direction orthogonal to an overlapping direction while being overlapped to sandwich the terminal fitting. A resilient lock piece cantilevered in the overlapping direction with respect to the lower housing is formed on a side edge part of the upper housing. A lock projection to be locked by the resilient lock piece when the both housings are overlapped is formed on a side surface of the lower housing. A stopper for locking the resilient lock piece when the both housings are slid is formed on the side surface of the lower housing. The stopper is disposed at a
(Continued)

position further separated from a base end portion of the resilient lock piece than the lock projection.

2 Claims, 8 Drawing Sheets

(56) References Cited

U.S. PATENT DOCUMENTS

| | | | | |
|---|---|---|---|---|
| 6,402,568 | B1 * | 6/2002 | Nagai | H01R 13/514 439/701 |
| 2018/0254579 | A1 | 9/2018 | Miyamura et al. | |
| 2021/0098931 | A1 | 4/2021 | Phatiwuttipat et al. | |
| 2021/0281032 | A1 | 9/2021 | Miyamura et al. | |

* cited by examiner

CONNECTOR INCLUDING A PAIR OF HOUSING MEMBERS

CROSS REFERENCE TO RELATED APPLICATIONS

This application is a national phase of PCT application No. PCT/JP2020/031613, filed on 21 Aug. 2020, which claims priority from Japanese patent application No. 2019-195762, filed on 29 Oct. 2019, all of which are incorporated herein by reference.

TECHNICAL FIELD

The present disclosure relates to a connector.

BACKGROUND

Patent Document 1 discloses a connector formed by overlapping and uniting two housing members and accommodating a plurality of terminal fittings between the both housing members. The both housing members are locked in a united state by fitting fitting projections formed on outer side surfaces of one housing member and fitting recesses formed in side wall portions of the other housing member.

PRIOR ART DOCUMENT

Patent Document

Patent Document 1: JP 2018-032534 A

SUMMARY OF THE INVENTION

Problems to be Solved

In fitting the fitting projections and the fitting recesses, the side wall portions of the other housing member are temporarily resiliently deformed and take an oblique posture when being resiliently deformed. Thus, it is unavoidable that clearance are formed in the same direction as a uniting direction of the both housing members between the fitting recesses and the fitting projections in a state where the side wall portions resiliently return and the fitting recesses are fit to the fitting projections.

As a measure against this, it is considered to slide the both housing members in a direction orthogonal to an overlapping direction after the both housing members are overlapped and fit non-resilient lock portions formed on the both housing members to each other. In this case, fitting recesses are locked to expanded parts of lock projections in a state where the lock projections are expanded in a sliding direction and the both housing members are slid. By doing so, it is possible to restrict relative displacements of the both housing members in a direction opposite to the sliding direction and hold the both housing members in the united state.

However, if the lock projections are expanded in the sliding direction, parts of the side wall portions ride on the expanded parts of the lock projections and the side wall portions are largely resiliently deformed when the both housing members are overlapped. If the side wall portions are largely resiliently deformed, stresses generated in base end portions of the side wall portions increase. If the stresses generated in the base end portions of the side wall portions increase, the side wall portions may be plastically deformed to lose a locking function thereof.

A connector of the present disclosure was completed on the basis of the above situation and aims to reduce a stress in a part for locking a pair of housing members in a united state.

Means to Solve the Problem

The present disclosure is directed to a connector with a terminal fitting, and a pair of housing members slidable in a direction orthogonal to an overlapping direction while being overlapped to sandwich the terminal fitting, wherein a resilient lock piece cantilevered in the overlapping direction with respect to the other housing member is formed on a side edge part of one of the housing members, a lock projection to be locked by the resilient lock piece when the both housing members are overlapped is formed on a side surface of the other housing member, a stopper for locking the resilient lock piece when the both housing members are slid is formed on the side surface of the other housing member, and the stopper is disposed at a position further separated from a base end portion of the resilient lock piece than the lock projection.

Effect of the Invention

According to the present disclosure, it is possible to reduce a stress in a part for locking a pair of housing members in a united state.

DETAILED DESCRIPTION TO EXECUTE THE INVENTION

Description of Embodiments of Present Disclosure

Figure 1:
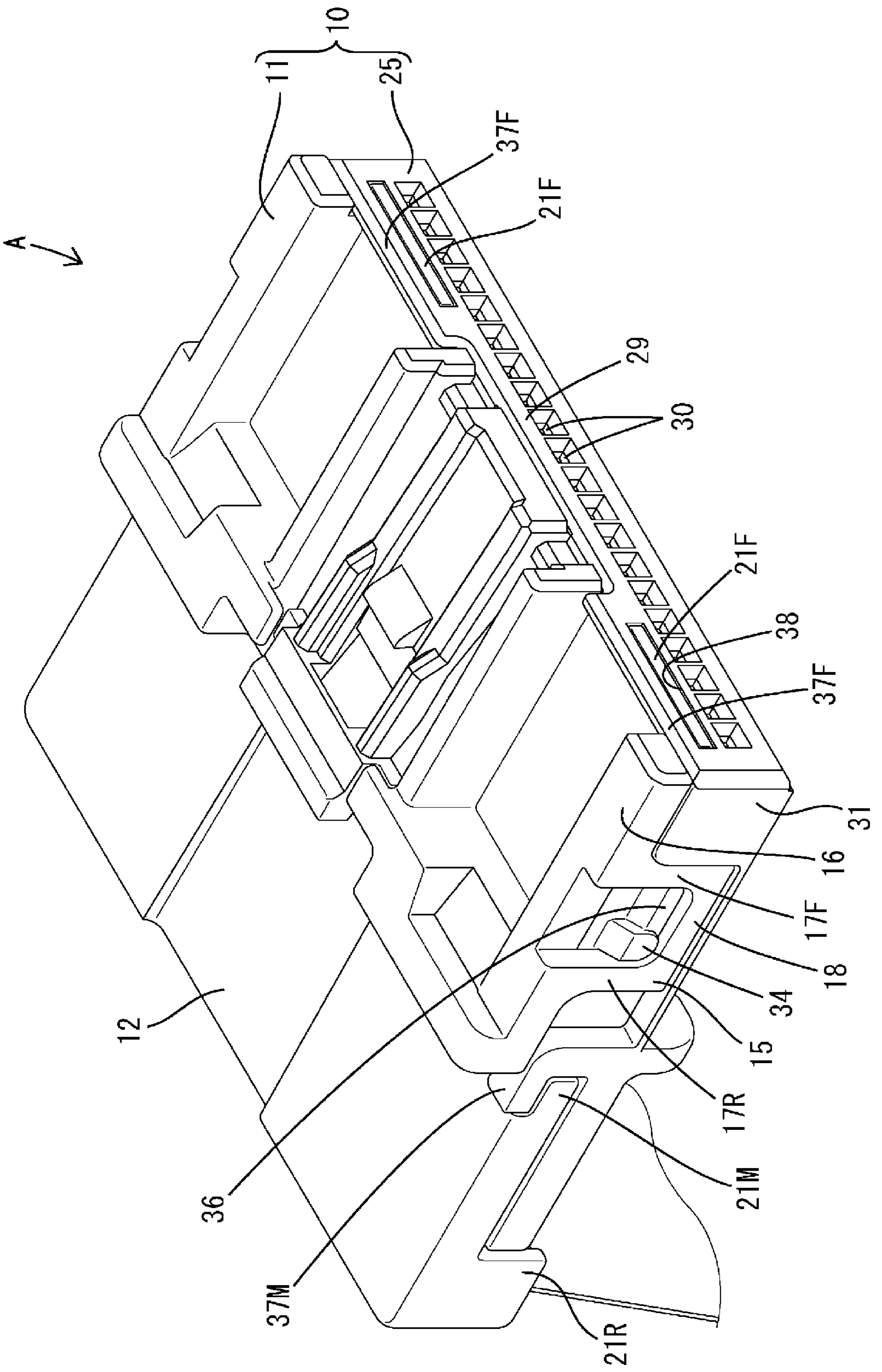
FIG. 1 is a perspective view of a connector of one embodiment.

First, embodiments of the present disclosure are listed and described.

(1) The connector of the present disclosure includes a terminal fitting, and a pair of housing members slidable in a direction orthogonal to an overlapping direction while being overlapped to sandwich the terminal fitting, wherein a resilient lock piece cantilevered in the overlapping direction with respect to the other housing member is formed on a side edge part of one of the housing members, a lock projection to be locked by the resilient lock piece when the both housing members are overlapped is formed on a side surface of the other housing member, a stopper for locking the resilient lock piece when the both housing members are slid is formed on the side surface of the other housing member, and the stopper is disposed at a position further separated from a base end portion of the resilient lock piece than the lock projection. That is, a dimension between the base end portion of the resilient lock piece and the stopper in an extending direction of the resilient lock piece is larger than a dimension between the base end portion of the resilient lock piece and the lock projection.

According to the configuration of the present disclosure, a part of the resilient lock piece rides on the stopper when the both housing members are overlapped, but the stopper is located at the position further separated from the base end portion of the resilient lock piece than the lock projection. In other words, the stopper is disposed at a position more distant from a deflection fulcrum of the resilient lock piece than the lock projection. Therefore, the resilient deformation amount of the resilient lock piece when the resilient lock piece rides on the stopper is small as compared to the case where the stopper is disposed at the same position as the lock projection in the extending direction of the resilient lock piece. In this way, a stress generated in the base end portion of the resilient lock piece is reduced.

(2) Preferably, a projecting dimension of the stopper from the side surface of the other housing member is smaller than that of the lock projection. According to this configuration, the resilient deformation amount of the resilient lock piece when the resilient lock piece rides on the stopper becomes even smaller.

(3) Preferably, the resilient lock piece includes a pair of arm portions extending in the extending direction of the resilient lock piece and a coupling portion coupling extending end parts of the arm portions, and a width of the arm portion configured to ride on the stopper when the both housing members are overlapped, out of the pair of arm portions, is smaller than that of the arm portion configured not to ride on the stopper. According to this configuration, a stress generated in the arm portion riding on the stopper can be reduced.

(4) Preferably, the pair of housing members are formed with a non-resilient lock portion to be fit when the both housing members are slid, and the both housing members are restricted from being separated in a direction opposite to the overlapping direction by fitting the non-resilient lock portion. According to this configuration, the both housing members can be reliably held in a united state.

(5) In (4), a plurality of the non-resilient lock portions are preferably disposed to sandwich the resilient lock piece from both sides in a sliding direction of the both housing members. According to this configuration, the both housing members can be reliably held in the united state.

Details of Embodiment of Present Disclosure

Embodiment

One specific embodiment of a connector A of the present disclosure is described below with reference to FIGS. 1 to 8. Note that the present invention is not limited to these illustrations and is intended to be represented by claims and include all changes in the scope of claims and in the meaning and scope of equivalents. In this embodiment, an oblique right-lower side in FIGS. 1 to 3 and a right side in FIGS. 4 and 6 is defined as a front side concerning a front-rear direction. Upper and lower sides shown in FIGS. 1 to 8 are directly defined as upper and lower sides concerning a vertical direction.

The connector A of this embodiment is configured by assembling a housing 10 made of synthetic resin and a flat cable 40. The housing 10 is configured by assembling an upper housing 11 equivalent to one housing member of the present invention and a lower housing 25 equivalent to the other housing member of the present invention. In assembling the both housings 11, 25, the upper housing 11 is united to be overlapped on the lower housing 25 from above and is slid forward with respect to the lower housing 25 while being overlapped.

Figure 2:
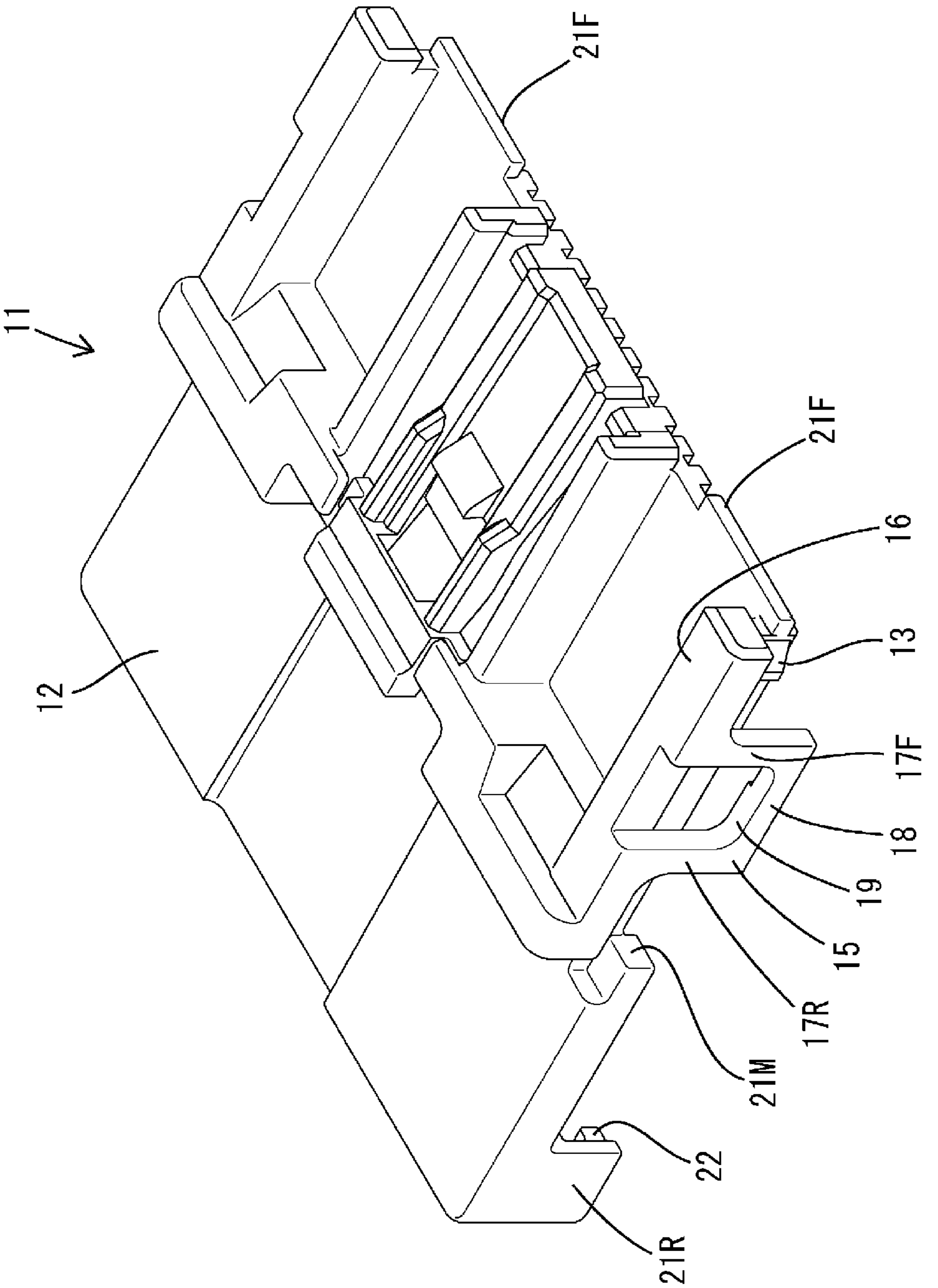
FIG. 2 is a perspective view of an upper housing.

As shown in FIGS. 1 and 2, the upper housing 11 is a single component including an upper wall portion 12, a pair of left and right retaining portions 13, a pair of left and right resilient lock pieces 15 and first to third fitting portions 21F, 21M and 21R functioning as non-resilient lock portions. The upper wall portion 12 has a rectangular shape in a plan view of the upper housing 11. As shown in FIG. 2, the pair of retaining portions 13 are formed on front end parts of both left and right side edges of the upper wall portion 12.

The pair of resilient lock pieces 15 are cantilevered downward from both left and right side edge parts of the upper wall portion 12. An extending direction of the resilient lock pieces 15 is the same as an overlapping direction of the upper housing 11 with respect to the lower housing 25. The resilient lock piece 15 includes a base end portion 16, a front arm portion 17F, a rear arm portion 17R and a coupling portion 18. The base end portion 16 is elongated in the front-rear direction and disposed along a region behind the retaining portion 13 on the left or right side edge part of the upper wall portion 12. The resilient lock piece 15 can be resiliently deformed in a lateral direction with the base end portion 16 as a fulcrum. A resilient deforming direction of the resilient lock piece 15 is a direction orthogonal to both the overlapping direction of the both housings 11, 25 and a sliding direction of the both housings 11, 25 overlapped each other.

The front arm portion 17F extends downward from a front end part of the base end portion 16. The rear arm portion 17R extends downward from a rear end part of the base end portion 16. A width in the front-rear direction of the rear arm portion 17R is larger than that of the front arm portion 17F. Accordingly, the rigidity of the front arm portion 17F is lower than that of the rear arm portion 17R. The coupling portion 18 is elongated in the front-rear direction and couples an extending end part of the front arm portion 17F and that of the rear arm portion 17R. The resilient lock piece 15 includes a lock hole 19 surrounded by the base end portion 16, the front arm portion 17F, the rear arm portion 17R and the coupling portion 18.

A pair of left and right first fitting portions 21F are elongated in the lateral direction and project forward like ribs from the front end surface of the upper wall portion 12. The first fitting portion 21F is located forward of the resilient lock piece 15. The first fitting portion 21F functions as a non-resilient lock portion and is designed not to be resiliently deformed. A pair of left and right second fitting portions 21M are formed in central parts in the front-rear direction of the both left and right side edge parts of the upper wall portion 12. The second fitting portion 21M protrudes laterally from the side edge part of the upper wall portion 12. The second fitting portion 21M functions as a non-resilient lock portion and is designed not to be resiliently deformed. The second fitting portion 21M is located rearward of the resilient lock piece 15. A pair of left and right third fitting portions 21R are formed on rear end parts of the both left and right side edge parts of the upper wall portion 12, i.e. at positions rearward of the second fitting portions 21M. The third fitting portion 21R includes a rib-like projection 22 extending in the front-rear direction on an inner surface. The third fitting portion 21R functions as a non-resilient lock portion and is designed not to be resiliently deformed.

Figure 3:
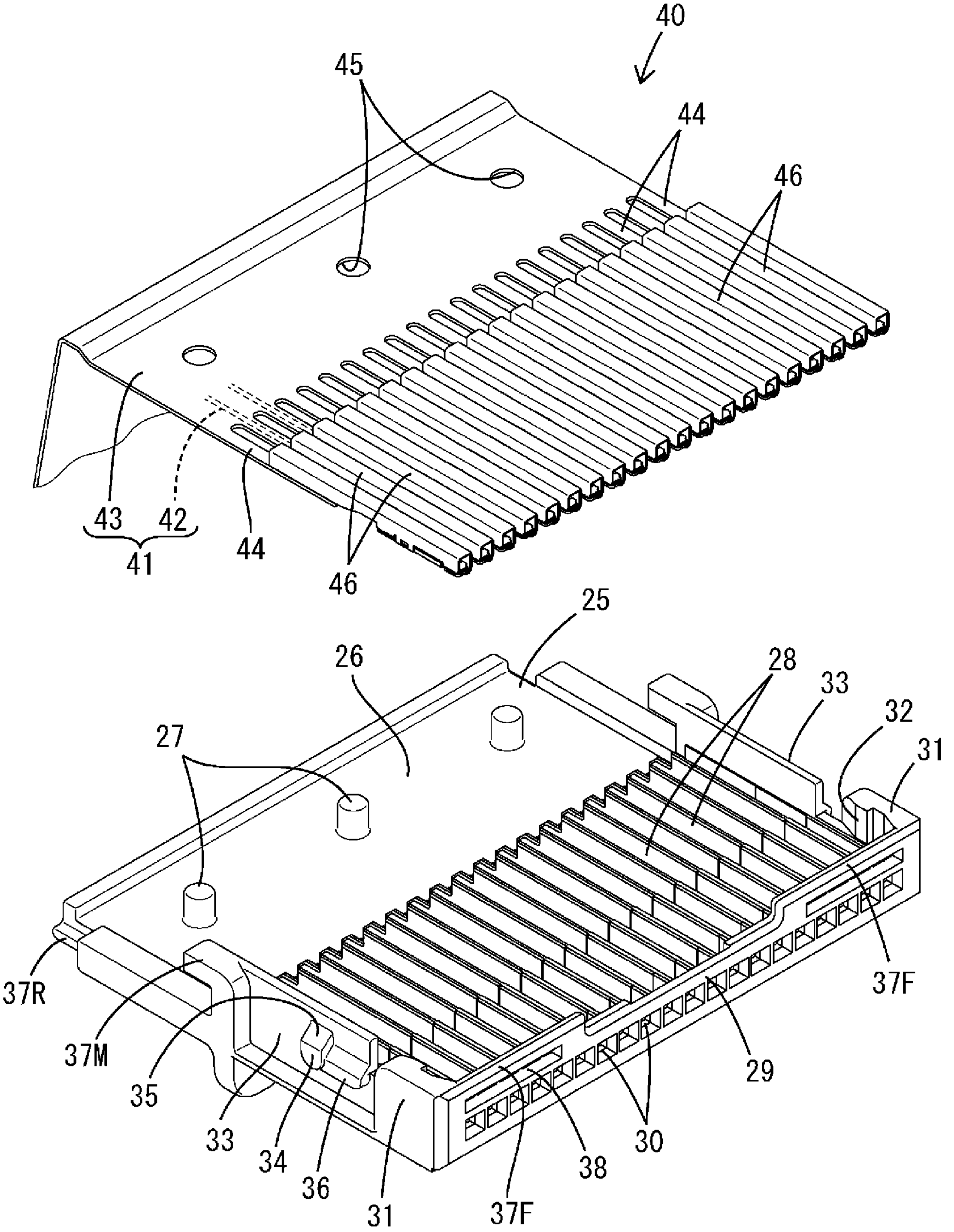
FIG. 3 is a perspective view in a state where a flat cable and a lower housing are vertically separated.
Figure 4:
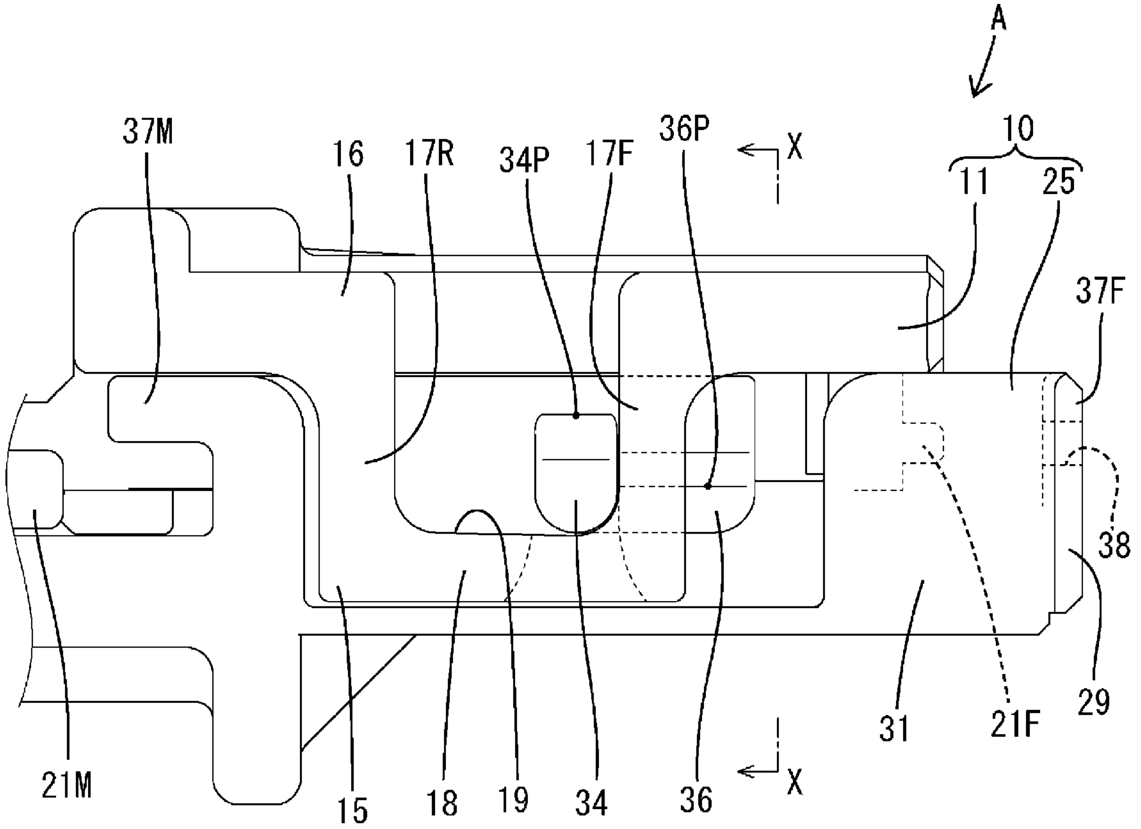
FIG. 4 is a partial enlarged side view in a state where the lower housing and the upper housing are overlapped.

As shown in FIG. 3, the lower housing 25 is a single component including a bottom wall portion 26, a front wall portion 29, a pair of left and right resilient locking portions 31, a pair of left and right side wall portions 33 and first to third receiving portions 37F, 37M and 37R. The bottom wall portion 26 has a rectangular shape in a plan view of the lower housing 25. A plurality of pins 27 spaced apart in the lateral direction are formed at positions closer to a rear end than a center in the front-rear direction on the upper surface of the bottom wall portion 26. A plurality of terminal accommodation grooves 28 elongated in the front-rear direction are formed laterally in parallel in the upper surface of the bottom wall portion 26.

The front wall portion 29 rises upward from the front end edge of the bottom wall portion 26 over an entire width region. A plurality of insertion openings 30 penetrating through the front wall portion 29 in the front-rear direction are formed at certain intervals in the lateral direction in the front wall portion 29. Male terminal fittings of an unillustrated mating connector are inserted into the insertion openings 30. The pair of left and right resilient locking portions 31 are cantilevered rearward from both left and right end parts of the front wall portion 29 and resiliently deformable in the lateral direction. Locking projections 32 to be locked by the retaining portions 13 of the upper housing 11 are formed on the inner surfaces of the resilient locking portions 31.

The pair of side wall portions 33 rise upward from both left and right side edges of the bottom wall portion 26. The side wall portion 33 is disposed at a position rearward of the resilient locking portion 31. The side wall portion 31 is designed not to be resiliently deformed. The both left and right side wall portions 33 are formed with lock projections 34 projecting from the outer side surfaces of the side wall portions 33. The lock projection 34 has a vertically long shape in a side view of the lower housing 25. An inclined guiding slope 35 is formed on an upper end part of the lock projection 34 in a front view of the lower housing 25.

Stoppers 36 are formed on the outer side surfaces of the both left and right side wall portions 33. The stopper 36 is arranged in front of and adjacent to the lock projection 34. When the both housings 11, 25 are slid in an assembling direction while being overlapped, the resilient lock pieces 15 move to positions forward of the lock projections 34. A projecting dimension of the stopper 36 from the side wall portion 33 is smaller than that of the lock projection 34. A dimension in the front-rear direction of the stopper 36 is larger than that of the lock projection 34.

A vertical dimension of the stopper 36 is smaller than that of the lock projection 34. The lower end of the stopper 36 is at the same height as the lower end of the lock projection 34. An upper end 36P of the outer surface of the stopper 36 is located below an uppermost end 34P of the lock projection 34. With the both housings 11, 25 assembled, the upper end 36P of the stopper 36 is at a position closer to the coupling portion 18, which is a free end of the resilient lock piece 15, than the uppermost end 34P of the lock projection 34. The lock projection 34 and the stopper 36 are arranged to form an L shape in a side view.

The pair of left and right first receiving portions 37F are formed on a rising end part of the front wall portion 29, i.e. in a region of the front wall portion 29 above the insertion openings 30. The pair of first receiving portions 37F include groove portions 38 elongated in the lateral direction and are arranged while being laterally spaced apart. The pair of first receiving portions 37F function as non-resilient lock portions and are designed not to be resiliently deformed. The first receiving portion 37F is located forward of the lock projection 34 and the stopper 36.

The pair of left and right second receiving portions 37M are formed on central parts in the front-rear direction of both left and right side edge parts of the bottom wall portion 26, i.e. at positions rearward of the lock projections 34. The pair of second receiving portions 37M are shaped to project rearward from rear end parts of the side wall portions 33. The second receiving portions 37M function as non-resilient lock portions and are designed not to be resiliently deformed.

The pair of left and right third receiving portions 37R are formed on the rear end parts of the bottom wall portion 26, i.e. at positions rearward of the second receiving portions 37M. The pair of third receiving portions 37R are in the form of ribs protruding laterally from the both left and right side edge parts of the upper wall portion 12. The third receiving portions 37R function as non-resilient lock portions and are designed not to be resiliently deformed.

The flat cable 40 is, for example, composed of flexible printed circuits, a flexible flat cable and the like. As shown in FIG. 3, the flat cable 40 includes one bendable sheet-like conductive path 41 and a plurality of terminal fittings 46. The sheet-like conductive path 41 is formed by covering a plurality of conductors 42 routed in parallel with a sheet-like insulating member 43.

A plurality of connecting portions 44 are formed like comb teeth in a front end part of the sheet-like conductive path 41 while being spaced apart in the lateral direction. One conductor 42 is routed in each connecting portion 44 and a front end part thereof is exposed. A region of the conductor 42 rearward of the connecting portion 44 is covered by the insulating member 43. In the front end part of the sheet-like conductive path 41, rear end parts of the plurality of terminal fittings 46 are conductively and individually fixed to exposed parts of the plurality of conductors 42 by soldering, welding or the like. A plurality of through holes 45 spaced apart in the lateral direction are formed in a region of the sheet-like conductive path 41 rearward of the terminal fittings 46.

In assembling the connector A of this embodiment, the flat cable 40 is first mounted into the lower housing 25. At this time, the flat cable 40 is positioned with respect to the lower housing 25 by fitting the through holes 45 of the sheet-like conductive path 41 to the pins 27 of the lower housing 25. Subsequently, the plurality of terminal fittings 46 are individually accommodated into the plurality of terminal accommodation grooves 28 from above the lower housing 25.

Thereafter, the upper housing 11 is assembled to cover the lower housing 25 from above. In assembling the both housings 11, 25, the upper housing 11 is placed on the lower housing 25 while being shifted rearward from a proper assembling position. In this way, the first to third fitting portions 21F, 21M and 21R are respectively located behind the first to third receiving portions 37F, 37M and 37R without interfering with the first to third receiving portions 37F, 37M and 37R.

In the process of placing the upper housing 11 on the lower housing 25, the coupling portions 18 of the resilient lock pieces 15 slide in contact with the guiding slopes 35, whereby the entire resilient lock pieces 15 are resiliently deformed and the coupling portions 18 temporarily ride on the lock projections 34. When the upper housing 11 is placed on the lower housing 25, the coupling portions 18 pass over the lock projections 34. Thus, the resilient lock pieces 15 resiliently return and the coupling portions 18 are positioned to lock or proximately face the lock projections 34 from below. In this way, the upper housing 11 and the lower housing 25 are restricted from being vertically separated, and are temporarily held in an overlapping state.

Figure 5:
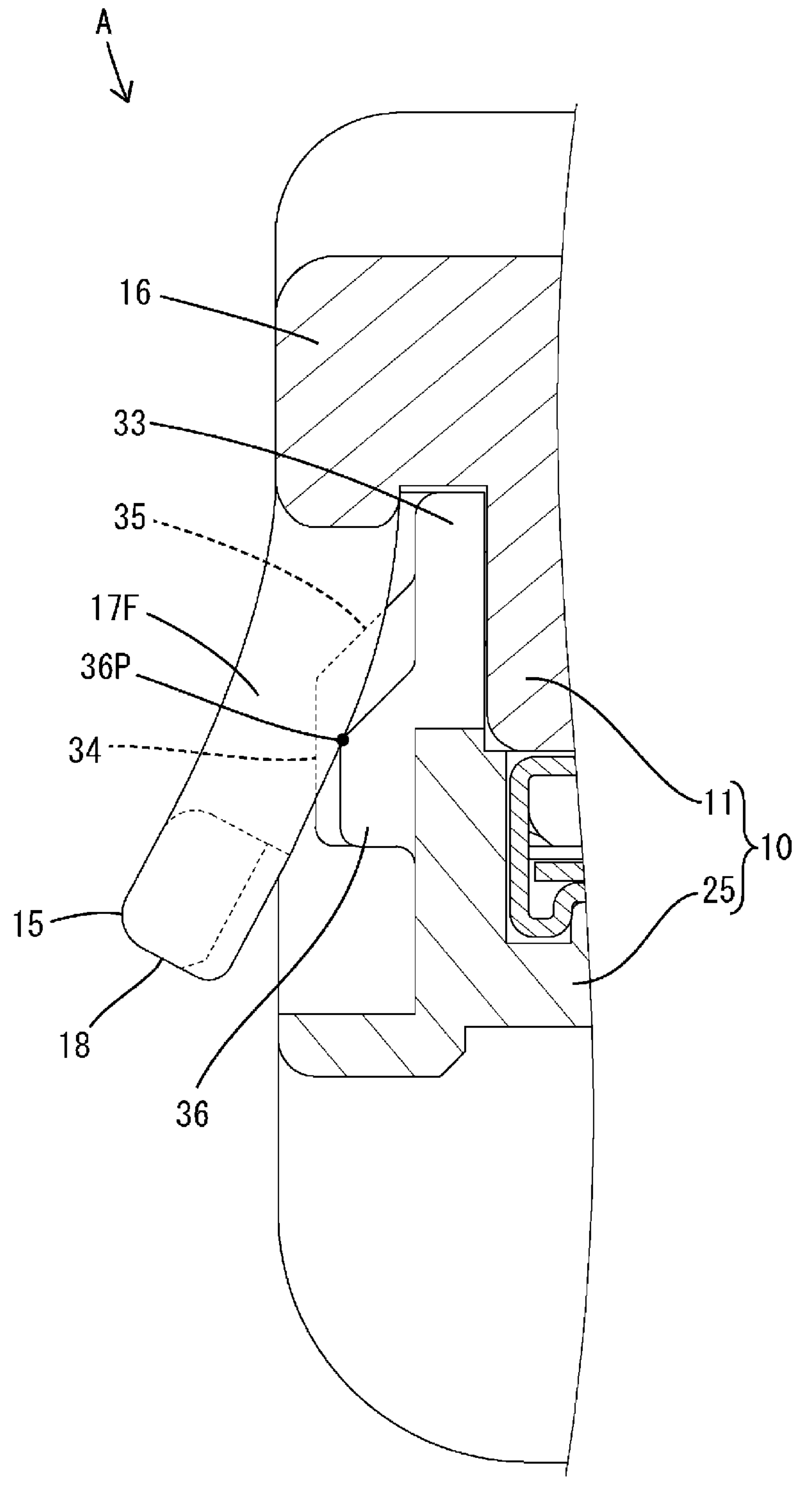
FIG. 5 is a section along X-X of FIG. 4.
Figure 6:
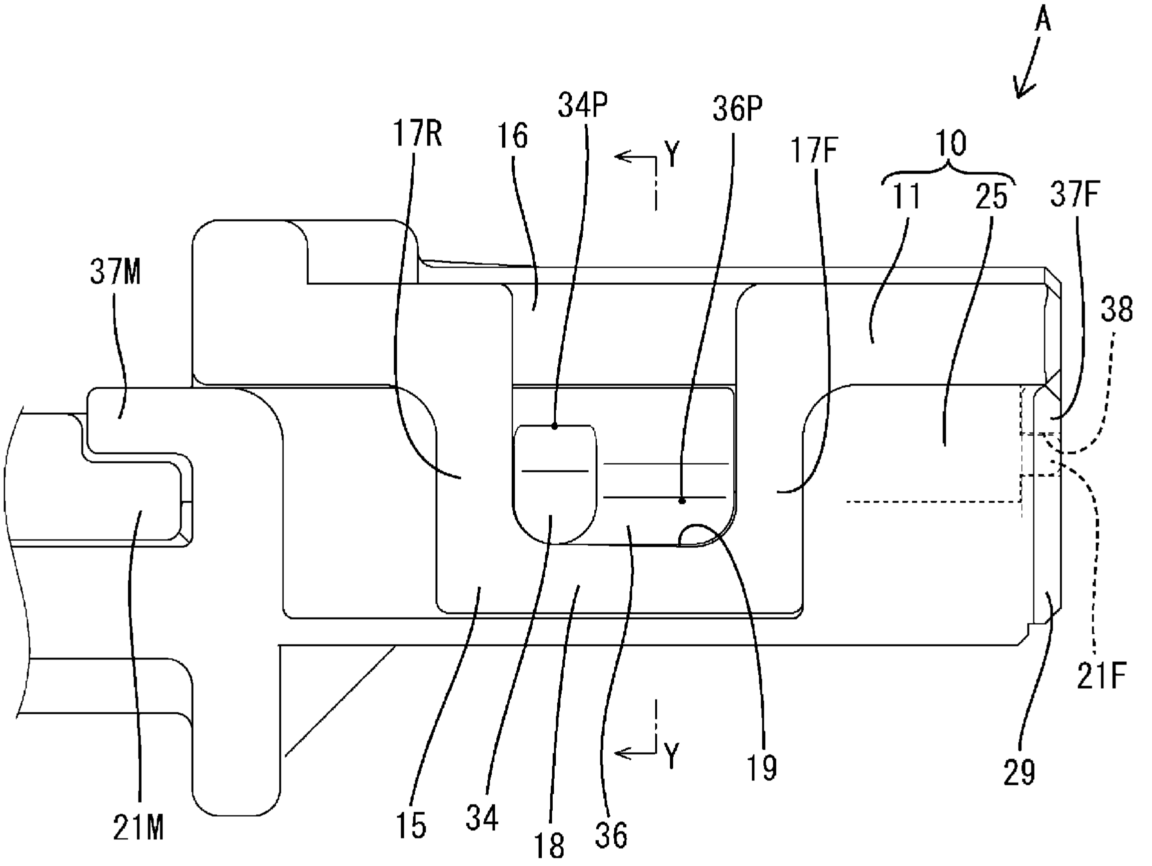
FIG. 6 is a partial enlarged side view in a state where the lower housing and the upper housing are slid while being overlapped.
Figure 7:
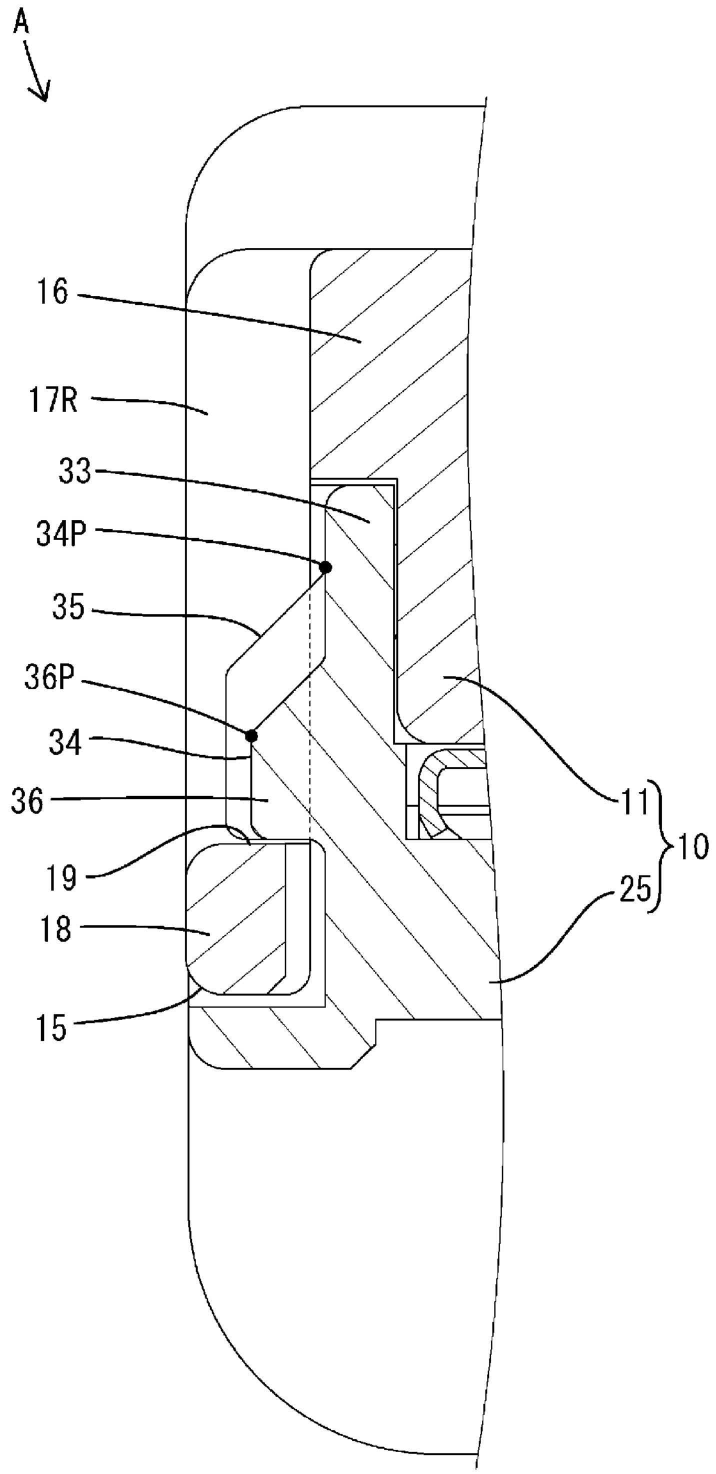
FIG. 7 is a section along Y-Y of FIG. 6.
Figure 8:
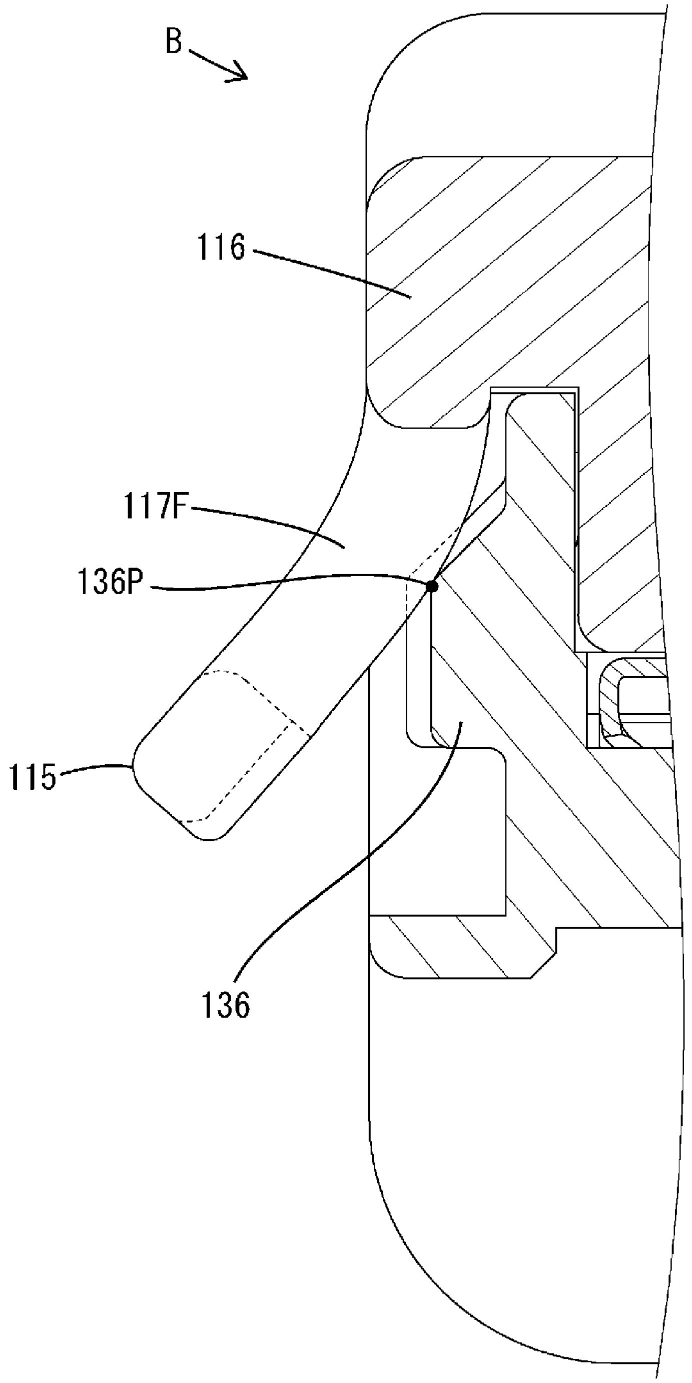
FIG. 8 is a section along X-X of a comparative example of the embodiment.

Since the front arm portion 17F rides on the stopper 36 as shown in FIGS. 4 and 5 with the both housings 11, 25 temporarily held, the front arm portion 17F is kept resiliently deformed with the base end portion 16 as a fulcrum. At this time, the front arm portion 17F comes into contact with the upper end 36P of the outer surface of the stopper 36. Thus, if a vertical dimension between an upper end 136P of the outer surface of a stopper 136 and a base end portion 116 of a resilient lock piece 115 is small as in a virtual connector B shown in FIG. 8 visualized as a comparison object with the connector A of this embodiment, a front arm portion 117F is relatively largely resiliently deformed and a stress generated in an upper end part of the front arm portion 117F is also relatively large.

In contrast, in the connector A of this embodiment, the position of the upper end 36P of the outer surface of the stopper 36 is sufficiently lower than the uppermost end 34P of the lock projection 34 and a vertical dimension between the upper end 36P of the stopper 36 and the base end portion 16 is large as shown in FIG. 5. Therefore, the resilient deformation amount of the front arm portion 17F is suppressed to be small and a stress generated in an upper end part of the front arm portion 17F is also reduced.

After the upper housing 11 and the lower housing 25 are vertically overlapped as described above, the upper housing 11 is slid relatively forward with respect to the lower housing 25. As the upper housing 11 is slid, the first fitting portions 21F are fit to the first receiving portions 37F from behind to enter the groove portions 38. The second fitting portions 21M are fit to slip under the second receiving portions 37M. The third fitting portions 21R are fit to the third receiving portions 37R to slip the rib-like projections 22 under the third receiving portions 37R.

Further, in the process of sliding the upper housing 11, the front arm portions 17F slide in contact with the outer surfaces of the stoppers 36. During this time, the front arm portions 17F are kept resiliently deformed. When the upper housing 11 and the lower housing 25 reach a properly assembled state, the front arm portions 17F pass over the stoppers 36. Thus, the resilient lock pieces 15 including the front arm portions 17F resiliently return and the front arm portions 17F are positioned to approach and face the stoppers 36 from front. In this way, the upper housing 11 is restricted from being relatively displaced in a direction to be separated rearward from the lower housing 25. Further, since the coupling portions 18 are positioned to approach and face the lock projections 34 and the stoppers 36 from below, the vertical separation of the upper housing 11 and the lower housing 25 is restricted.

Likewise, in the process of sliding the upper housing 11, the retaining portions 13 interfere with the locking projections 32 and the resilient locking portions 31 are temporarily resiliently deformed. When the both housings 11, 25 reach the properly assembled state, the retaining portions 13 pass over the locking projections 32. Thus, the resilient locking portions 31 resiliently return and the retaining portions 13 are locked to the locking projections 32 from front. In this way, the upper housing 11 is restricted from being relatively displaced in the direction to be separated rearward from the lower housing 25.

In the above way, a step of configuring the housing 10 by uniting the both housings 11, 12, a step of mounting the flat cable 40 into the housing 10 and a step of assembling the connector A are completed. With the assembling of the connector A completed, the vertical separation of the upper housing 11 and the lower housing 25 is restricted by fitting the first to third fitting portions 21F, 21M and 21R and the first to third receiving portions 37F, 37M and 37R. Further, the upper housing 11 is restricted from being relatively displaced in the direction to be separated rearward from the lower housing 25 by locking the retaining portions 13 and the locking projections 32. In the above way, the both housings 11, 24 are held in the united state.

The connector A of this embodiment includes the terminal fittings 46, the upper housing 11 and the lower housing 25. The upper housing 11 and the lower housing 25 are slidable in the direction orthogonal to the overlapping direction while being overlapped to sandwich the terminal fittings 46. The resilient lock pieces 15 cantilevered in the overlapping direction with respect to the lower housing 25, i.e. downward, are formed on the side edge parts of the upper housing 11. The lock projections 34 for locking the resilient lock pieces 15 when the both housings 11, 25 are overlapped are formed on the side surfaces of the lower housing 25.

The stoppers 36 to be locked by the front arm portions 17F of the resilient lock pieces 15 when the both housings 11, 25 are slid are formed on the side surfaces of the lower housing 25. When the both housings 11, 25 are overlapped, parts of the resilient lock pieces 15, i.e. the front arm portions 17F, ride on the stoppers 36. Here, the stopper 36 is disposed at a position further separated from the base end portion 16 of the resilient lock piece 15 than the lock projection 34. In particular, the upper end 36P of the outer surface of the stopper 36 is disposed at a position further in the extending direction of the resilient lock piece 15 than the uppermost end 34P of the lock projection 34. In other words, the upper end 36P of the stopper 36 is disposed at a position more distant from the base end portion 16 serving as a deflection fulcrum of the resilient lock piece 15 than the uppermost end 34P of the lock projection 34. That is, a dimension between the base end portion 16 serving as the deflection fulcrum of the resilient lock piece 15 and the upper end 36 of the stopper 36 is larger than a dimension between the base end portion 16 and the uppermost end 34P of the lock projection 34 in the vertical direction, which is the extending direction of the resilient lock piece 15.

Accordingly, the resilient deformation amounts of the resilient lock piece 15 and the front arm portion 17F are small when the front arm portion 17F rides on the stopper 36 as compared to the case where the upper end 36P of the stopper 36 is disposed at the same position as or near the uppermost end 34P of the lock projection 34 in the vertical direction parallel to the extending direction of the resilient lock piece 15. In this way, stresses generated in the base end portion 16 of the resilient lock piece 15 and the upper end part of the front arm portion 17F are reduced. The projecting dimension of the stopper 36 from the side surface of the lower housing 25 is smaller than that of the lock projection 34. According to this configuration, the resilient deformation amounts of the resilient lock piece 15 and the front arm portion 17F are further reduced when the resilient lock piece 15 rides on the stopper 36.

The resilient lock piece 15 includes the front and rear arm portions 17F, 17R extending in the extending direction of the resilient lock piece 15 and the coupling portion 18 coupling the extending end parts of the both arm portions 17F, 17R. The width of the front arm portion 17F configured to ride on the stopper 36 when the housing 10 is overlapped, out of the pair of arm portions 17F, 17R, is smaller than that of the rear arm portion 17R configured not to ride on the stopper 36. According to this configuration, a stress generated in the front arm portion 17F riding on the stopper 36 can be reduced.

The upper housing 11 and the lower housing 25 are formed with the non-resilient lock portions to be fit when the both housings 11, 15 are slid and the assembling of the both housings 11, 25 is completed. These non-resilient lock portions include the first to third fitting portions 21F, 21M and 21R formed on the upper housing 11 and the first to third receiving portions 37F, 37M and 37R formed on the lower housing 25. Any of the first to third fitting portions 21F, 21M and 21R and the first to third receiving portions 37F, 37M and 37R is designed not to be resiliently deformed. By fitting the first to third fitting portions 21F, 21M and 21R and the first to third receiving portions 37F, 37M and 37R, the both housings 11, 25 can be reliably restricted from being separated in a direction opposite to the overlapping direction. Therefore, the both housings 11, 25 can be reliably held in the united state.

The first and second fitting portions 21F, 21M, the first and third fitting portions 21F, 21R, the first and second receiving portions 37F, 37M and the first and third receiving portions 37F, 37R are all disposed in such a positional relationship as to sandwich the resilient lock pieces 15 from both sides in the sliding direction of the both housings 11, 25, i.e. in the front-rear direction. According to this configuration, the both housings 11, 25 can be reliably held in the united state.

Other Embodiments

The present invention is not limited to the above described and illustrated embodiment and is represented by claims. The present invention is intended to include all changes in the scope of claims and in the meaning and scope of equivalents and also include the following embodiments.

Although the projecting dimension of the stopper from the side surface of the other housing member is set smaller than that of the lock projection in the above embodiment, the projecting dimension of the stopper may be equal to or larger than that of the lock projection.

Although the width of the arm portion configured to ride on the stopper is set smaller than that of the arm portion configured not to ride on the stopper in the above embodiment, the width of the arm portion configured to ride on the stopper may be equal to or larger than that of the arm portion configured not to ride on the stopper.

Although the plurality of non-resilient lock portions are disposed to sandwich the resilient lock piece in the above embodiment, one non-resilient lock portion may be provided. Further, the positional relationship of the plurality of non-resilient lock portions is not limited to that for sandwiching the resilient lock piece, but may be an arbitrary positional relationship.

LIST OF REFERENCE NUMERALS

A . . . connector
B . . . virtual connector
10 . . . housing
11 . . . upper housing (one housing member)
12 . . . upper wall portion
13 . . . retaining portion
15 . . . resilient lock piece
16 . . . base end portion
17F . . . front arm portion (arm portion)
17R . . . rear arm portion (arm portion)
18 . . . coupling portion
19 . . . lock hole
21F . . . first fitting portion (non-resilient lock portion)
21M . . . second fitting portion (non-resilient lock portion)
21R . . . third fitting portion (non-resilient lock portion)
22 . . . rib-like projection
25 . . . lower housing (other housing member)
26 . . . bottom wall portion
27 . . . pin
28 . . . terminal accommodation groove
29 . . . front wall portion
30 . . . insertion opening
31 . . . resilient locking portion
32 . . . locking projection
33 . . . side wall portion
34 . . . lock projection
34P . . . uppermost end of lock projection
35 . . . guiding slope
36 . . . stopper
36P . . . upper end of stopper
37F . . . first receiving portion (non-resilient lock portion)
37M . . . second receiving portion (non-resilient lock portion)
37R . . . third receiving portion (non-resilient lock portion)
38 . . . groove portion
40 . . . flat cable
41 . . . sheet-like conductive path
42 . . . conductor
43 . . . insulating member
44 . . . connecting portion
45 . . . through hole
46 . . . terminal fitting
115 . . . resilient lock piece
116 . . . base end portion
117F . . . front arm portion
136 . . . stopper
136P . . . upper end of stopper

What is claimed is:

1. A connector, comprising:
a terminal fitting; and
a pair of housing members slidable in a direction orthogonal to an overlapping direction while being overlapped to sandwich the terminal fitting,
wherein:
a resilient lock piece cantilevered in the overlapping direction with respect to the other housing member is formed on a side edge part of one of the housing members,
a lock projection to be locked by the resilient lock piece when the both housing members are overlapped is formed on a side surface of the other housing member,
a stopper for locking the resilient lock piece when the both housing members are slid is formed on the side surface of the other housing member,
the stopper is disposed at a position further separated from a base end portion of the resilient lock piece than the lock projection,
the resilient lock piece includes a pair of arm portions extending in an extending direction of the resilient lock piece and a coupling portion coupling extending end parts of the arm portions, and
a width of the arm portion configured to ride on the stopper when the both housing members are overlapped, out of the pair of arm portions, is smaller than that of the arm portion configured not to ride on the stopper.

2. A connector, comprising:

a terminal fitting; and a pair of housing members slidable in a direction orthogonal to an overlapping direction while being overlapped to sandwich the terminal fitting, wherein:

a resilient lock piece cantilevered in the overlapping direction with respect to the other housing member is formed on a side edge part of one of the housing members, a lock projection to be locked by the resilient lock piece when the both housing members are overlapped is formed on a side surface of the other housing member, a stopper for locking the resilient lock piece when the both housing members are slid is formed on the side surface of the other housing member, the stopper is disposed at a position further separated from a base end portion of the resilient lock piece than the lock projection, the pair of housing members are formed with a non-resilient lock portion to be fit when the both housing members are slid, the both housing members are restricted from being separated in a direction opposite to the overlapping direction by fitting the non-resilient lock portion, and a plurality of the non-resilient lock portions are disposed to sandwich the resilient lock piece from both sides in a sliding direction of the both housing members.

* * * * *